US011319888B2

(12) United States Patent
Graichen et al.

(10) Patent No.: US 11,319,888 B2
(45) Date of Patent: May 3, 2022

(54) METHOD FOR THE MODEL-BASED OPEN LOOP AND CLOSED LOOP CONTROL OF AN INTERNAL COMBUSTION ENGINE

(71) Applicant: MTU Friedrichshafen GmbH, Friedrichshafen (DE)

(72) Inventors: Knut Graichen, Heroldsberg (DE); Daniel Bergmann, Ulm (DE); Roman Geiselhart, Blaustein (DE); Jens Niemeyer, Friedrichshafen (DE); Jörg Remele, Hagnau (DE); Karsten Harder, Oberteuringen (DE); Tim Späder, Langenargen (DE)

(73) Assignee: Rolls-Royce Solutions GmbH, Friedrichshafen (DE)

(*) Notice: Subject to any disclaimer, the term of this patent is extended or adjusted under 35 U.S.C. 154(b) by 0 days.

(21) Appl. No.: 17/214,258

(22) Filed: Mar. 26, 2021

(65) Prior Publication Data
US 2021/0231071 A1 Jul. 29, 2021

Related U.S. Application Data

(63) Continuation of application No. PCT/EP2019/075391, filed on Sep. 20, 2019.

(30) Foreign Application Priority Data

Sep. 27, 2018 (DE) .................. 10 2018 007 647.5

(51) Int. Cl.
*F02D 41/14* (2006.01)
*F02D 41/02* (2006.01)
*F01N 3/20* (2006.01)

(52) U.S. Cl.
CPC ......... *F02D 41/1406* (2013.01); *F01N 3/208* (2013.01); *F02D 41/0235* (2013.01);
(Continued)

(58) Field of Classification Search
CPC .... F01N 3/08; F01N 2610/02; F02D 41/0235; F02D 41/1406; F02D 41/1445;
(Continued)

(56) References Cited

U.S. PATENT DOCUMENTS

| 8,731,762 | B1 | 5/2014 | Wang et al. |
| 2017/0218815 | A1 | 8/2017 | Stewart et al. |
| 2018/0216558 | A1 | 8/2018 | Buchholz et al. |

FOREIGN PATENT DOCUMENTS

| DE | 10 2011 078 161 A1 | 9/2012 |
| DE | 10 2011 085 454 A1 | 5/2013 |

(Continued)

OTHER PUBLICATIONS

Cao, "Gaussian Process based Model Predictive Control," PhD dissertation, p. 55. (Year: 2017).*

(Continued)

*Primary Examiner* — Hung Q Nguyen
*Assistant Examiner* — Mark L. Greene
(74) *Attorney, Agent, or Firm* — Taylor IP, P.C.

(57) ABSTRACT

A method for regulation of an internal combustion engine with an SCR catalytic converter in which the operating point of the engine is predefined by an engine control unit and the operating point of the catalytic converter is predefined by an SCR control unit. An overall system quality measure is calculated by an optimizer in accordance with fed back values of the engine control unit and fed back values of the SCR control unit, by changing the default values for the engine control unit and the SCR control unit, the optimizer minimizes the overall system quality measure for a prediction horizon regarding operating costs. On the basis of the minimized overall system quality measure the optimizer sets the default values for the engine control unit and the default (Continued)

values for the SCR control unit as decisive for setting the operating point of the engine and the catalytic converter.

8 Claims, 7 Drawing Sheets

(52) U.S. Cl.
CPC ....... *F02D 41/146* (2013.01); *F02D 41/1445* (2013.01); *F02D 41/1446* (2013.01); *F01N 2610/02* (2013.01); *F02D 2041/1412* (2013.01); *F02D 2041/1433* (2013.01); *F02D 2200/0625* (2013.01); *Y02T 10/12* (2013.01)

(58) Field of Classification Search
CPC ............... F02D 41/1446; F02D 41/146; F02D 2041/1412; F02D 2041/1433; F02D 2200/0625; Y02T 10/12
See application file for complete search history.

(56) References Cited

FOREIGN PATENT DOCUMENTS

| | | |
|---|---|---|
| DE | 10 2013 220 432 A1 | 4/2015 |
| DE | 10 2014 225 039 A1 | 6/2016 |
| DE | 10 2015 212 709 A1 | 1/2017 |
| DE | 10 2017 005 783 A1 | 12/2018 |
| DE | 10 2018 001 727 A1 | 9/2019 |
| EP | 3 062 176 A2 | 8/2016 |
| WO | 2016/005414 A1 | 1/2016 |
| WO | WO-2017190760 A1 * | 11/2017 ............ B60W 20/11 |

OTHER PUBLICATIONS

International Search Report and Written Decision from the International Searching Authority dated Dec. 11, 2019 for International Application No. PCT/EP2019/075391 (11 pages).

* cited by examiner

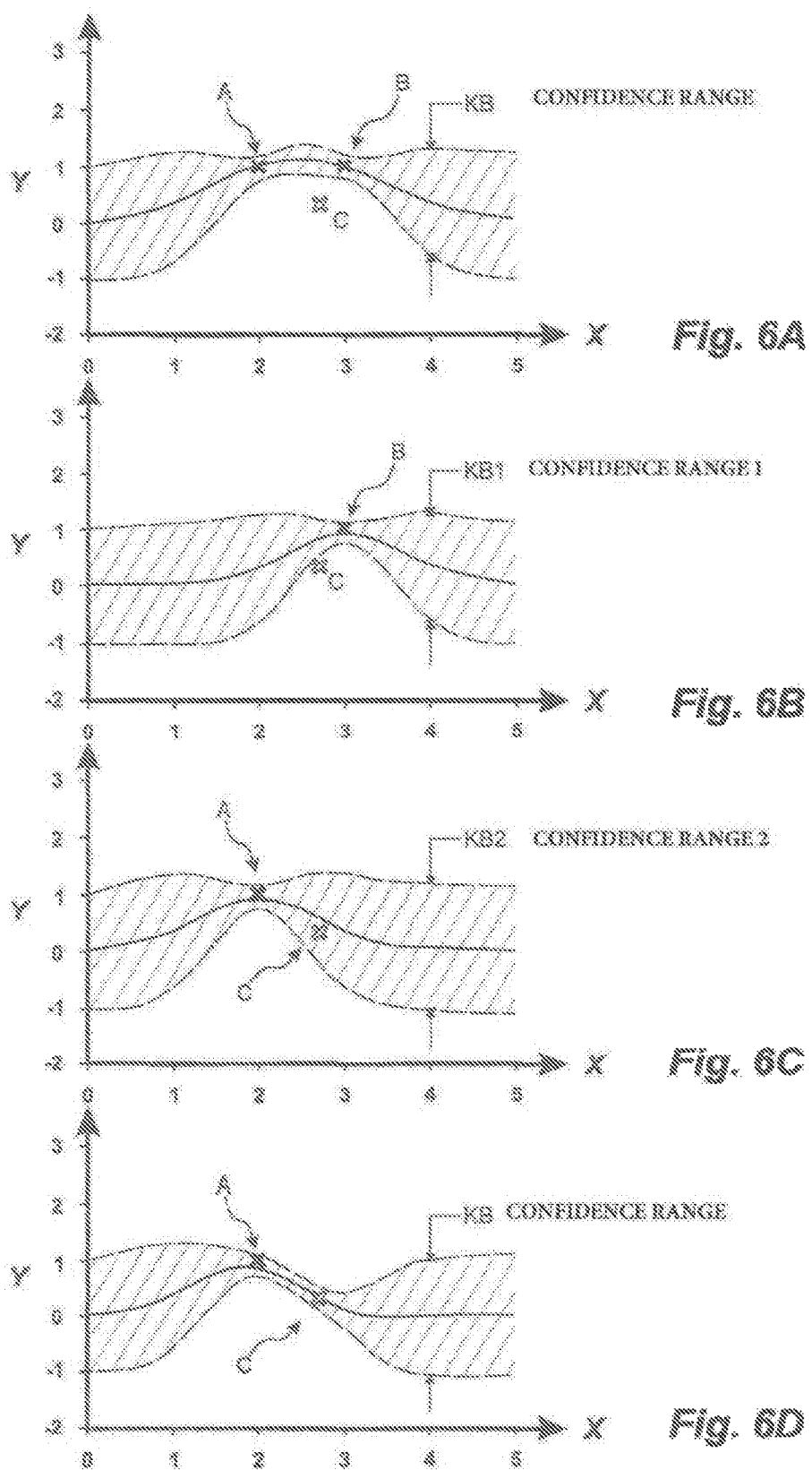

METHOD FOR THE MODEL-BASED OPEN LOOP AND CLOSED LOOP CONTROL OF AN INTERNAL COMBUSTION ENGINE

CROSS REFERENCE TO RELATED APPLICATIONS

This is a continuation of PCT application No. PCT/EP2019/075391, entitled "METHOD FOR THE MODEL-BASED OPEN-LOOP AND CLOSED-LOOP CONTROL OF AN INTERNAL COMBUSTION ENGINE WITH AN SCR CATALYTIC CONVERTER", filed Sep. 20, 2019, which is incorporated herein by reference.

BACKGROUND OF THE INVENTION

1. Field of the Invention

The current invention relates to a method for model-based control and regulation of an internal combustion engine with a Selective Catalytic Reduction (SCR) catalytic converter in which the operating point of the internal combustion engine is predefined by means of an engine control unit and the operating point of the SCR catalytic converter is predefined by means of an SCR control unit.

2. Description of the Related Art

The behavior of an internal combustion engine is significantly determined by way of an engine control unit, based on an operator request. In the software of the engine controller, relevant characteristic curves and performance graphs are applied for this purpose. By way of these, the manipulated variables of the internal combustion engine, for example, the start of injection and a necessary rail pressure are calculated based on the desired performance, for example, from a set torque. During a test bench run these characteristic curves/performance graphs are populated with data by the producer of the internal combustion engine. The plurality of these characteristic curves/performance graphs and the interaction of the characteristic curves/performance graphs among each other; however, cause a high adaptation effort. If the internal combustion engine is equipped with an SCR catalytic converter, the characteristic curves/performance graphs in the SCR control unit and the interaction with the engine control unit must additionally be adapted.

In practice therefore, attempts are made to reduce the adaptation effort by applying mathematical models. From the German patent application DE 10 2017 005 783.4 (not prepublished) a model-based control and regulating method for an internal combustion engine is known, wherein injection system setpoint values for controlling the injection system actuators are calculated using a combustion model, and gas path setpoint values for controlling the gas path actuators are calculated via a gas path model. These setpoint values are then changed by an optimizer with the objective to minimize a measure of quality within a prediction horizon.

The minimized measure of quality in turn defines the best possible operating point of the internal combustion engine. However, no indication of the interaction of the engine control unit with an SCR control unit can be gathered from the reference.

SUMMARY OF THE INVENTION

The present invention relates to a method for model-based control and regulation of an internal combustion engine, along with an SCR catalytic converter.

The method operates on the basis of an operator request in which an overall system quality measure is calculated by an overall system optimizer, based on fed back values of the engine control unit and fed back values of the SCR control unit. By changing the default values for the engine control unit and by changing the default values for the SCR control unit, the overall system optimizer minimizes the overall system quality measure for a prediction horizon with regard to operating costs. Once a minimized overall system quality measure has been determined, the overall system optimizer sets the default values for the engine control unit and the default values for the SCR control unit as decisive for setting the operating point of the internal combustion engine and the SCR catalytic converter. The operating costs are then calculated from the fuel consumption and the reducing agent consumption, for example, by using the Nelder-Mead or the Simplex method.

The overall system quality measure is minimized in that a first overall system quality measure is calculated by the overall system optimizer at a first point in time. At a second point in time, a second overall system quality measure is predicted for the prediction horizon and a deviation between the first and the second overall system quality measure is determined. If the deviation is less than a threshold value, the overall system optimizer will set the second overall system quality measure as a minimized overall system quality measure. As an alternative, the overall system optimizer will set the second overall system quality measure as a minimized overall system quality measure after running through a number of pre-definable new calculations.

An NOx setpoint and an exhaust gas temperature setpoint are provided by the overall system optimizer to the engine control unit as default values. At least one emission setpoint—which in turn originates from a library—is provided to the SCR control unit as a default value by the overall system optimizer. The default values for the engine control unit are calculated by means of an engine card in the sense of a Gaussian process model. The default values for the SCR control unit are calculated by way of an SCR card, which is also designed as a Gaussian process model. A fuel consumption value, an actual NOx value, an actual exhaust gas temperature value and an exhaust gas mass flow are input by the overall system optimizer as fed back values. The actual NOx value, the actual exhaust gas temperature value and an exhaust gas mass flow relate to the turbine outlet of an exhaust gas turbocharger. A maximum conversion rate, an SCR time constant and a reducing agent consumption value are input as fed back values of the SCR control unit.

In addition to the known advantage of modularization, namely a reduction in complexity, a greater degree of freedom is achieved by the invention. For example, a higher exhaust gas temperature setpoint is maintained in the event of load dumping, due to which the SCR catalytic converter achieves a higher maximum conversion rate. So that the operating costs of the overall system are nevertheless minimized, the new operating point of the combustion engine is specified in the engine characteristics diagram by the overall system optimizer in such a way that lower specific fuel consumption results. This means that the increased costs of the reducing agent are offset by a lower specific fuel consumption. Due to the use of standardized interfaces, new components can be integrated without problems into the hierarchical control system, for example, a radiator control system. In the case of an integrated radiator control, the cost of operating the cooling system is converted into fuel consumption. The overall system optimizer then calculates if stronger cooling of the overall system would result in a lower overall operating cost. Special attention was directed to a low data exchange between the overall system optimizer and the individual components, as a result of which, as already previously mentioned, the complexity of the system description and the computational efforts are reduced. Thus, cards for the overall system optimizer are created for the behavior of the subordinate components. The system behavior, in regard to the considered interfaces is described therein. In other words, on the plane of the overall system optimizer detailed knowledge is not required from the subordinate components.

The hierarchical control can of course also be used for a multi-engine system.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 6A is a state diagram illustrating a current adaptation data point and a valid confidence range;

FIG. 6B is another state diagram illustrating a current adaptation data point and a valid confidence range;

FIG. 6C is yet another state diagram illustrating a current adaptation data point and a valid confidence range;

FIG. 6D is still yet another state diagram illustrating a current adaptation data point and a valid confidence range;

Corresponding reference characters indicate corresponding parts throughout the several views. The exemplifications set out herein illustrates one embodiment of the invention, in one form, and such exemplification is not to be construed as limiting the scope of the invention in any manner.

DETAILED DESCRIPTION OF THE INVENTION

Figure 1:
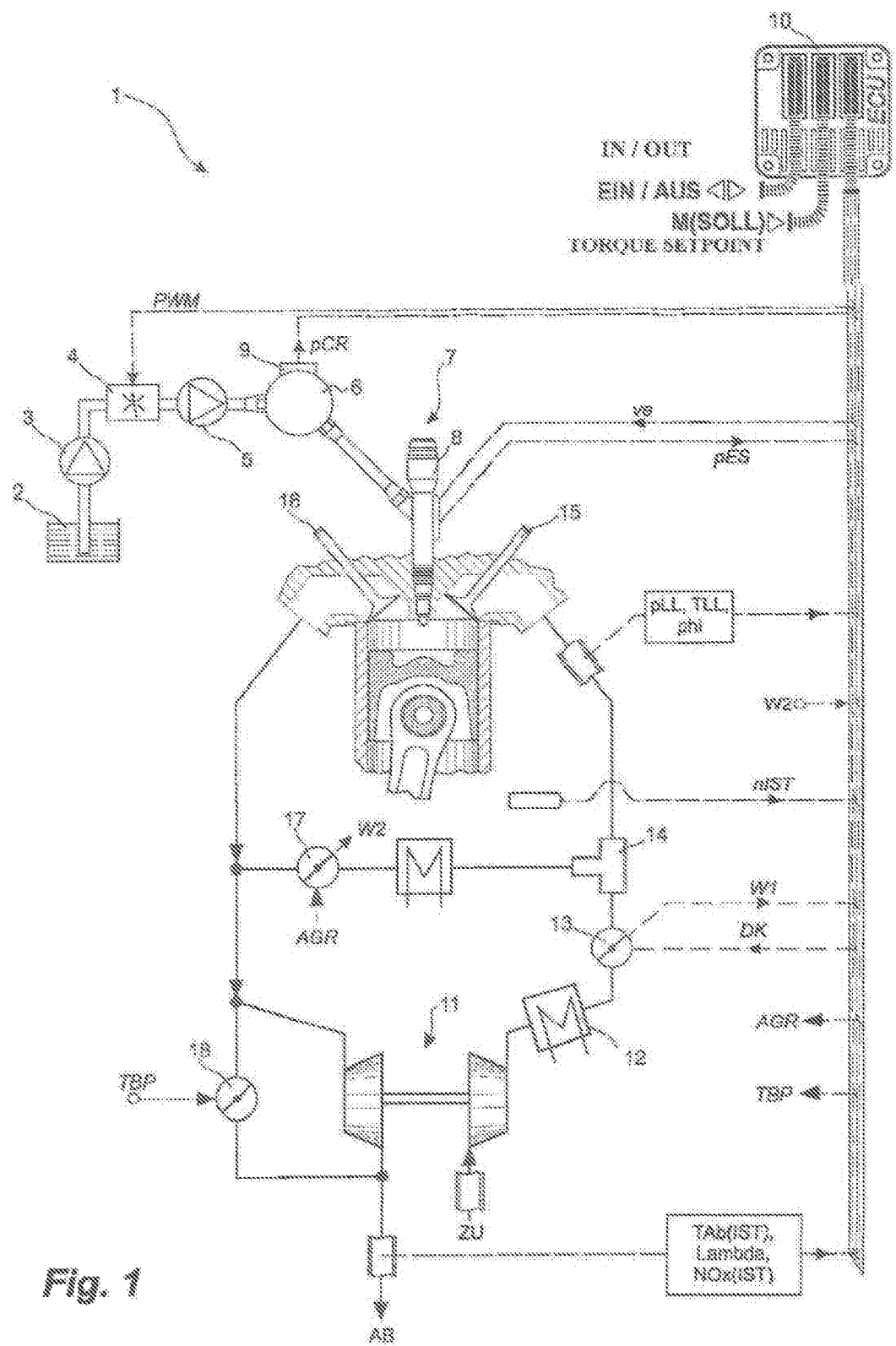
FIG. 1 is a schematical system diagram of an embodiment of an SCR control system of the present invention.

Exemplary embodiments provided according to the present invention are illustrated by the drawings and now referring to FIG. 1 there is shown a system diagram of an electronically controlled internal combustion engine 1 with a common rail system. The abbreviations used in the figures are presented below, and are referred to herein. The common rail system includes the following mechanical components: a low pressure pump 3 to move fuel from a fuel tank 2, a variable suction throttle 4 to influence the fuel volume flow, a high pressure pump 5 to move fuel under increased pressure, a rail 6 for the storing of fuel and injectors 7 for injecting the fuel into the combustion chambers of internal combustion engine 1. The common rail system may optionally also be equipped with individual accumulators, wherein for example, an individual accumulator 8 is integrated into injector 7 as an additional buffer volume. The additional functionality of the common rail system is assumed to be known.

The illustrated gas path includes both, air supply and also exhaust gas removal. Arranged in the air supply are the compressor of an exhaust gas turbocharger 11, a charging air cooler 12, a throttle valve 13, merging point 14 for merging of the charging air with the recirculated exhaust gas and inlet valve 15. In addition, exhaust gas valve 16, an AGR actuator 17, the turbine of exhaust gas turbocharger 11 and a turbine bypass valve 18 are installed in the exhaust gas route. In place of the illustrated exhaust gas return a variable valve control can also be used.

The operating mode of internal combustion engine 1 is determined by an engine control unit 10 (ECU). Engine control unit 10 includes the usual components of a microcomputer system, for example a microprocessor, I/O modules, buffers and memory chips (EEPROM, RAM). The operating data relevant to the operation of internal combustion engine 1 are applied as models in the memory chips. By way of these, engine control unit 10 calculates the output values from the input values. In FIG. 1 the following input values are illustrated as examples: setpoint torque M(SOLL), which is specified by the operator, rail pressure pCR, which is measured by means of a rail pressure sensor 9, actual engine speed nIST, charging air pressure pLL, charging air temperature TLL, moisture phi in charging air, actual exhaust gas temperature Tab(IST), air/fuel ratio Lambda, the actual NOx value NOx(IST), optionally the pressure pES of individual accumulator 8, adjustment angle w1 of throttle valve 13, adjustment angle w2 of AGR actuator 17 and an input value EIN. The additional sensor signals which are not illustrated, for example, the coolant temperatures are combined under input value EIN. The following output values of engine control unit 10 are illustrated in FIG. 1: A signal PWM for control of suction throttle 4, a signal ye for control of injectors 7 (injection start/injection end), an actuating signal DK for controlling throttle valve 13, an actuating signal AGR for controlling AGR actuator 17, an actuating signal TBP for controlling turbine bypass valve 18 and an output value AUS. Output value AUS is representative for the additional actuating signals for control and regulation of internal combustion engine 1, for example for an actuating signal for activation of a second exhaust gas turbocharger during a register charge.

Figure 2:
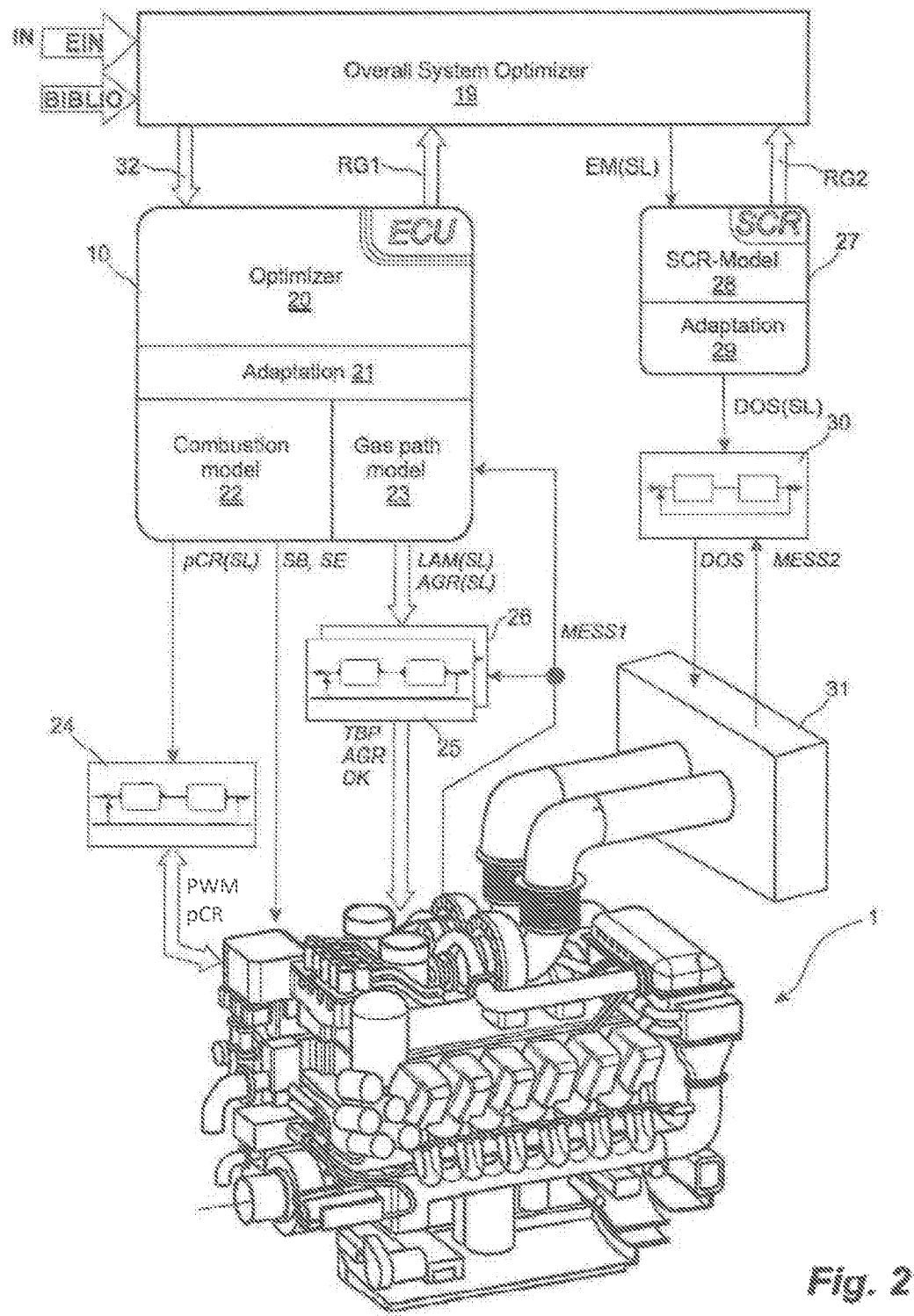
FIG. 2 is a model-based system diagram of the control system of FIG. 1.

FIG. 2 shows a model-based system diagram with an overall system optimizer 19, engine control unit 10, internal combustion engine 1, an SCR control unit 27 and an SCR catalytic converter 31. The functionality generally consists in that, overall system optimizer 19 on the basis of the operator demand and under consideration of the operating costs determines the default values for engine control unit 10 and the default values for SCR control unit 27. On the basis of these default values, engine control unit 10 then adjusts the operating point of internal combustion engine 1 and SCR control unit 27 determines the operating point for SCR catalytic converter 31. The two control units 10 and 27 may also be applied on a single control device as software components. The input values of overall system optimizer 19 are: operator request EIN, exhaust gas library BIBLIO, a fed back value RG1 of engine control unit 10 and a fed back value RG2 of SCR control unit 27. Operator request EIN is representative for the setpoint torque (FIG. 1: M(SOLL) or for a setpoint rotational speed, for example 1500 rpm on a 50 Hz generator system. The exhaust gas library BIBLIO stands for the selection of a statutory emission class by the operator in accordance with the global scope of application, for example IMO III or tier 4f Fed back value RG1 includes the actual use of the internal combustion engine, the actual NOx value, the actual exhaust gas temperature value and the exhaust gas mass flow, in each case related to the output of the turbine of the exhaust gas turbocharger. The fed back value RG2 of SCR control unit 27 to overall system optimizer 19 are in accordance with a maximum conversion rate, an SCR time constant and a reducing agent use. The output values of overall system optimizer 19 are: default values 32 to engine control unit 10 and an emission setpoint EM(SL) as a default value to SCR control unit 27, wherein the latter relates to the output of the SCR catalytic converter. Default values 32 specifically include an NOx setpoint and an exhaust gas temperature setpoint, each related to the exhaust gas path after the turbine exhaust gas turbocharger.

From default values 32, engine control unit 10, in turn, determines its regulating values and its setpoint values. The output values of engine control unit 10 are: setpoint rail pressure pCR(SL) for a rail pressure control circuit 24, a Lambda setpoint value LAM(SL) for a lambda control circuit 25, an AGR setpoint value AGR(SL) for an AGR control circuit 26 and injection start or injection end SE. The regulating value for rail pressure control circuit 24 then corresponds with the PWM signal PWM with which suction throttle 4 is controlled. The actual rail pressure is identified with reference pCR. The regulating value for lambda control circuit 25 and the regulating value of AGR control circuit 26 correspond with control signals for throttle valve DK, for turbine bypass TBP and for the AGR actuator. The actual values are indicated in the drawing under the collective reference of MESS1. An optimizer 20, an adaption 21, a combustion model 22 and a gas path model 23 are arranged inside control unit 10. Combustion model 22 and gas path model 23 illustrate the system behavior of the internal combustion engine as a mathematical equation. Combustion model 22 shows statically the process during the combustion. In contrast thereto, gas path model 23 displays the dynamic behavior of the air flow and exhaust gas flow route. Combustion model 22 includes individual models, for example for NOx- and soot development, for the exhaust gas temperature, for the exhaust gas mass flow and for the peak pressure. These individual models in turn are subject to the constraints in the cylinder which can be determined by the gas path model, and the parameters of the injection. Combustion model 22 is determined on a reference internal combustion engine in a test bench run, the so-called DoE-test bench run (DoE: Design of experiments). During the DoE test bench run operating parameters and control value are systematically varied with the objective to map the overall behavior of the internal combustion engine as a function of engine sizes and environmental threshold limits. The specific calculation instructions inside engine control unit 10 are presented in German patent applications, reference DE 10 2017 005 783.4 (not prepublished) and DE 10 2018 001 727.4 (not prepublished) to which reference is made herein.

The default value for SCR control unit 27 is emission setpoint value EM(SL) established by overall system optimizer 19. Emission setpoint value EM(SL) is selected from library BIBLIO. The output values of SCR control unit 27 are a metering setpoint DOS(SL) as a regulating value for subordinate SCR control circuit 30 and fed back value RG2 to overall system optimizer 19. The regulating value for the metering system corresponds to a metering volume DOS. The actual value of SCR catalytic converter is identified with reference MESS2. Fed back value RG2 is representative for a maximum conversion rate of SCR catalytic converter, a time constant and the current reducing agent consumption. An SCR model 28 and an adaption 29 are shown in SCR control unit 27.

Figure 3:
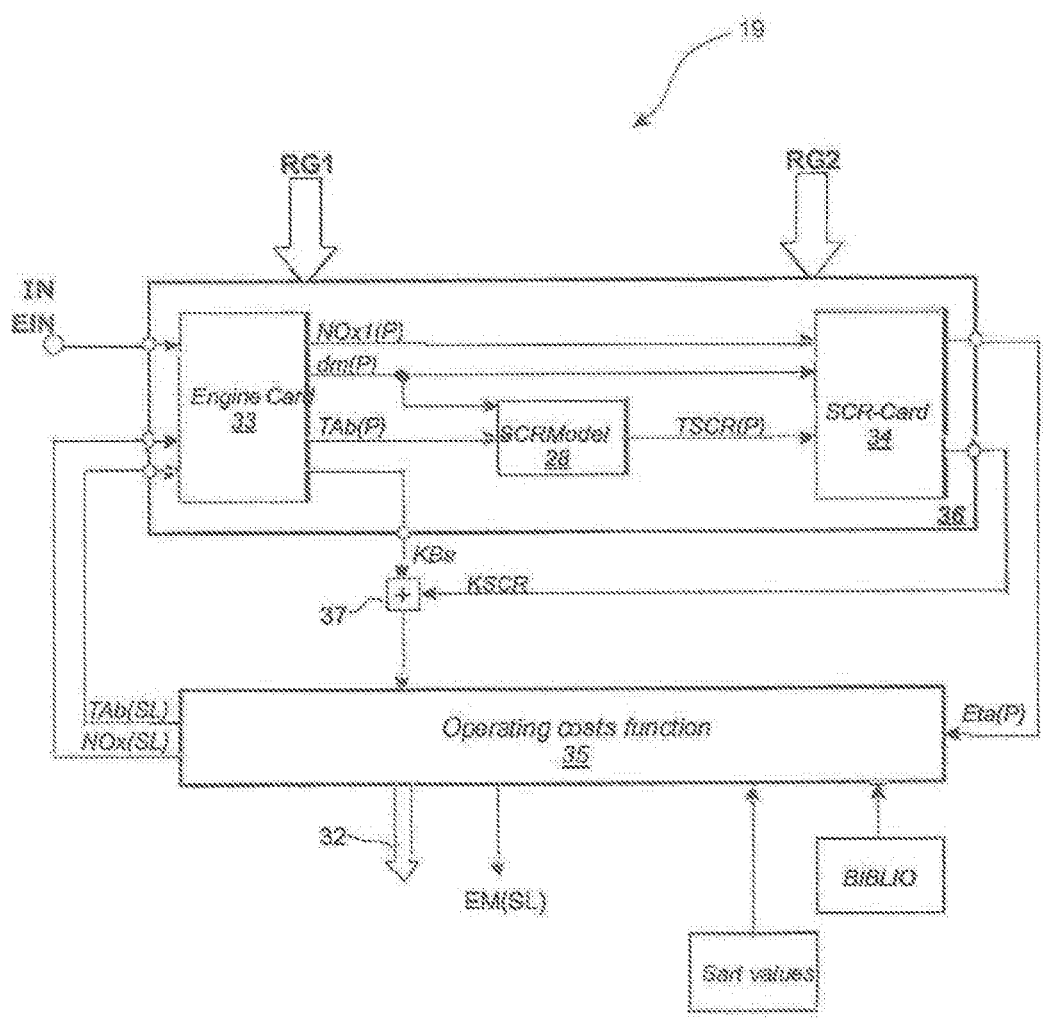
FIG. 3 is a structural block diagram of the control system of FIGS. 2 and 3.

FIG. 3 illustrates a structural diagram of overall system optimizer 19. An overall model 36 and operating cost function 35 are shown. The operating cost function is minimized via the operating costs, for example according to the Nelder-Mead or Simplex method. The default values for engine control unit 10 and for SCR control unit 27 represent the degrees of freedom of the optimization method. The Nelder-Mead method is a so-called derivative-free optimization method which is especially suitable for optimization tasks with a small number of degrees of freedom. In the Nelder-Mead method employed herein, the current operational situation and one or two predicted future operational situations are taken into consideration in the optimization process. The operating cost function can also be evaluated over a longer time period; in doing so a greater number of temporal steps are predicted and considered for the calculation of the operating costs. Such a procedure is also referred to as model-predictive control. Corresponding optimization procedures for solving the model-predictive control are known to the expert. Both, the stationary as well as the dynamic behavior can be considered for a temporal prediction step. Overall model 36 and operating cost function 35 are running repetitively in a loop. The input values of the structure diagram are: value RG1 fed back by engine control unit 10, value RG2 fed back by the SCR control unit, library BIBLIO, starting values and value EIN which subsumes the setpoint torque or a setpoint rotational speed. The first run is started with the starting values and via operating cost function 35, first starting values are generated for an NOx setpoint NOx(SL) and for an exhaust gas temperature setpoint Tab(SL). These starting values are the input values for an engine card 33. Engine card 33 is designed as a Gaussian process model. For example:

$$\text{Engine card} = GP1 + GP2.$$

GP1 herein corresponds with a first Gaussian process model for the representation of the base grid, and GP2 corresponds with a second Gaussian process model for the representation of the adaptation data points. The base grid and the adaptation data points are calculated from fed back value RG1. Gaussian process models are known to the expert, for example from DE 10 2014 225 039 A1 or DE 10 2013 220 432 A1. Generally, a Gaussian process is defined by an averaging function and a covariance function. The averaging function is often assumed to be zero or a polynomial progression is introduced. The covariance function indicates the connection between any points. An example for the adaptation of engine card 33 is described in further detail in connection with FIGS. 5 and 6A-6D.

The output values of engine card 33 correspond with a predicted first NOx value NOx1(P), a predicted exhaust gas mass flow dm(P) using the unit of kilogram/second, a predicted exhaust gas temperature Tab(P) and a predicted fuel consumption or costs KBs arising therefrom. SCR model 28 determines a predicted SCR exhaust gas temperature TSCR(P) from the predicted exhaust gas mass flow dm(P) and the predicted exhaust gas temperature Tab(P). From the predicted SCR exhaust gas temperature TSCR(P), the predicted exhaust gas mass flow dm(P) and the predicted first NOx value NOx1(P) the SCR costs KSCR and a predicted maximum conversion rate Eta(P) are calculated by an SCR card 34. The calculation basis for SCR costs KSCR is the reduction agent consumption, for example the Adblue consumption. SCR card 34 is constructed analogous to the engine card as a Gaussian process model.

Therefore, the following applies in general:

$$SCR\ card = GP1 + GP2$$

GP1 herein corresponds with a first Gaussian process model for the representation of the base grid, and GP2 corresponds with a second Gaussian process model for the representation of the adaptation data points. The base grid and the adaptation data points are calculated from fed back value RG2 of the SCR control unit. SCR card 34 generally describes the maximum achievable conversion rate of the SCR catalytic converter subject to the operating conditions, in other words, the SCR exhaust gas temperature and the exhaust gas mass flow.

At a summation point 37 costs KBs and costs KSCR are totaled, and the result is fed to operating cost function 35. In operating function 35 an overall system quality measure is then calculated as integral of the square setpoint-actual deviation within the predicted horizon, for example:

$$J = \int (\text{costs BKM} + \text{costs SCR} + [\max(0, (\text{Eta}(SL) - \text{Eta}(P)))^2]) dt \quad (1)$$

Value Eta(SL) herein corresponds to the desired value of the maximum achievable conversion rate of the SCR catalytic converter, and value Eta(P) corresponds to the precalculated maximum achievable conversion rate of the SCR catalytic converter.

The costs are now being minimized in that via operating cost function 35 the NOx setpoint NOx(SL) and exhaust gas temperature setpoint Tab(SL) are changed, by way of the loop a new overall system quality measure is calculated, and the two calculated overall system quality measures are compared with one another. See description for FIG. 4. If a minimum is found, the default values 32 are output to engine control unit 10 and emission setpoint value EM(SL) is output as a default value to SCR control unit 27.

Figures 4, 4A:
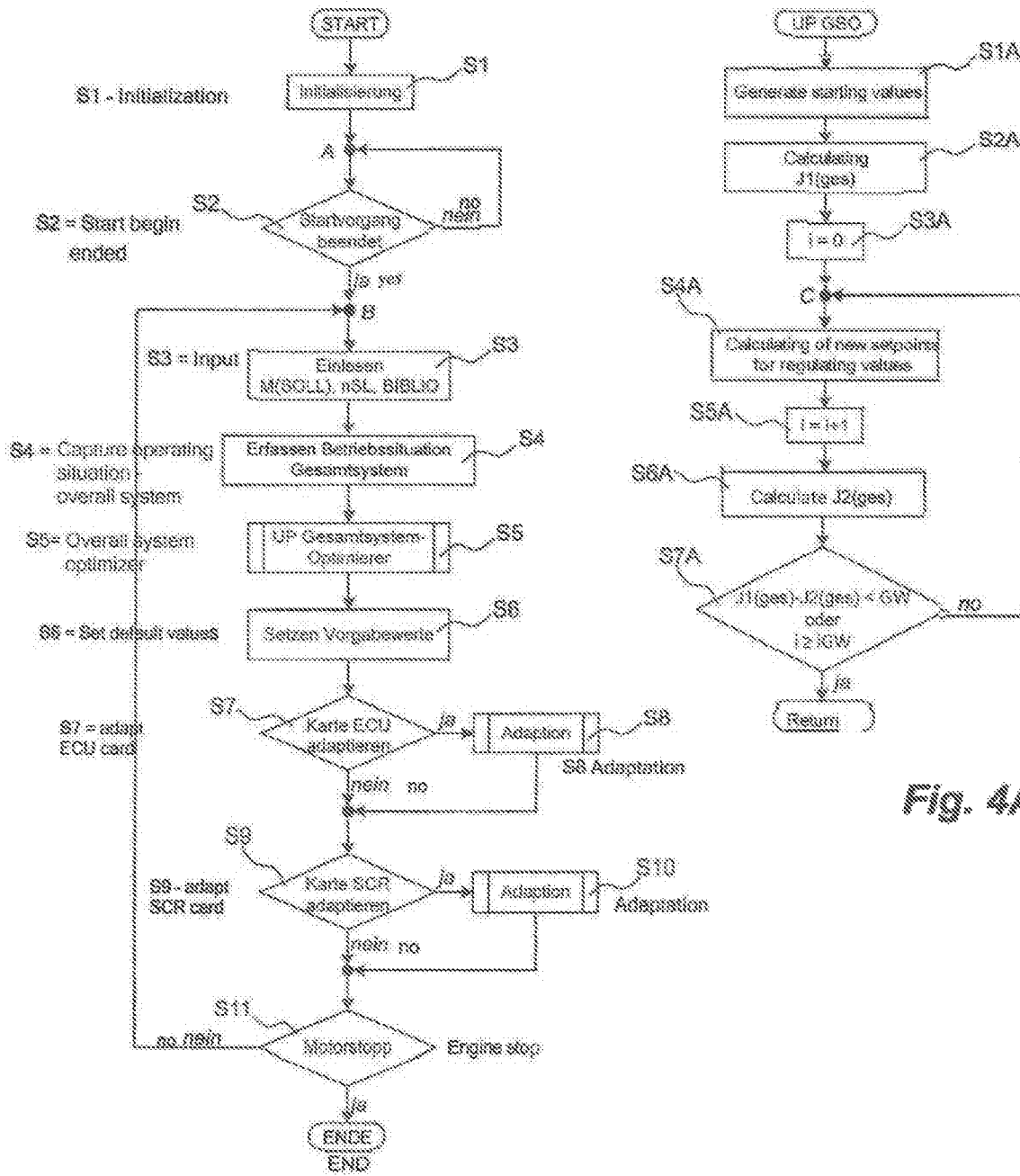
FIG. 4 is a program flow chart of the operation of the control system of FIGS. 1-3.
FIG. 4A is a subprogram flow chart illustrating a routine called at step S5 of the program illustrated in FIG. 4.

FIG. 4 shows the method for determining the minimum operating costs in a program flow chart. After initialization at S1, it is verified at S2 if the starting process has ended. If it is still running—query result S2: no, the program branches back to point A. If the starting process has ended the input values which are specified by the operator are input at S3 by the overall system optimizer. These are: setpoint torque M(SOLL), a setpoint engine speed n(SL) and the selection of the exhaust gas library BIBLIO. Subsequently, the operational situation of the overall system, in other words of the internal combustion engine with the SCR catalytic converter is captured at S4. The operating situation is defined via the measured values, and in particular by the actual engine speed nIST, the charging air temperature TLL, the charging air pressure pLL, the moisture phi of the charging air and the temperature of the SCR catalytic converter. At S5 the subprogram overall system optimizer, which is shown in FIG. 4A, is initiated. In this subprogram the initial values are then generated at S1A. From these initial values a first overall system quality measure J1(ges) is then calculated at S2A on the basis of equation (1), and a control variable i is set to zero at S3A. Thereafter, the initial values are changed at S4A and are calculated as new setpoint values. At S5A, control variable i is increased by one. At S6A, on the basis of the new setpoints, a second overall system quality measure J2(ges) is predicted within the prediction horizon, for example, for the next two minutes.

Figure 5:
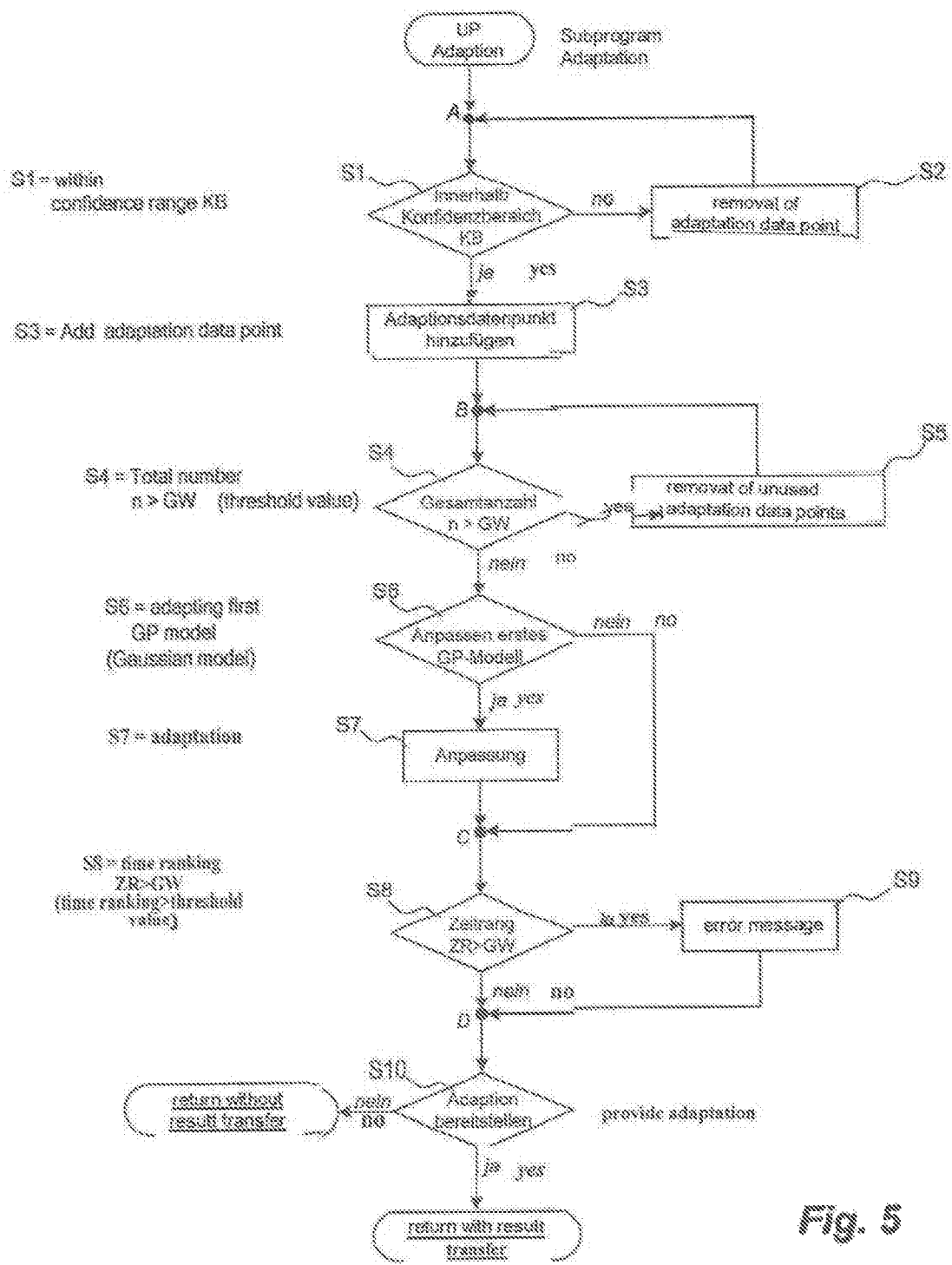
FIG. 5 illustrates sub program UP adaptation, which is called at step S8 and S10 of the program illustrated in FIG. 4.

At S7A, the second overall system quality measure J2(ges) is again subtracted from the first overall system quality measure J1(ges) and compared with a threshold value GW. The further progress of the overall system quality measure is checked via the difference formation between the two overall system quality measures. Alternatively, a check is conducted on the basis of a comparison between control variable i and a threshold value iGW as to how often an optimization has already been run. In this respect the two threshold considerations are a cancellation criterion for further optimization. As to whether additional optimization is possible—query result: S7A: no, the program returns to point C. Otherwise, the system branches back to the main program and, at S6 the overall system optimizer sets second overall system quality measure J2(ges) as the minimum overall system quality measure. Then, the default values for the engine control unit and the SCR control unit result from the minimum quality measure. Then, a check is made at S7 as to whether the engine card is to be adapted. In the event of a positive test result a change occurs at S8 into the adaptation subprogram. The subprogram is shown in FIG. 5 and is discussed in connection therewith. After running through the subprogram the program sequence is continued at S9. In the event of a negative test result at S7, query result S7: no, a request is made at S9 as to whether the SCR card is to be adapted. In the event of a positive test result the program branches to the adaptation subprogram (FIG. 5) at S10 and, after running through the subprogram, continues with the program flow sequence at S11. In the event of a negative test result at S9—query result S9: no—it is queried at S11 if an engine stop had been initiated. If this is not the case, the program branches back to point B. Otherwise, the program flow sequence is terminated.

Subprogram UP adaptation is shown in FIG. 5. At S1 a check is made as to whether the current data point is within the valid confidence range KB. If it is outside the valid confidence range KB—query result S1: no, the program branches to S2 and an already stored adaptation data point is removed. Thereafter, the program branches back to point A and is again checked at S1 as whether now the current adaptation data point is within the new confidence range. This case is illustrated and explained in FIGS. 6A-6D. Thus, in loop S1 and S2 adaptation points are removed from the second Gaussian process model until the current adaptation point is within the new confidence range. If it was observed at S1 that the current data point is within the confidence range KB—query result S1: yes—then the current adaptation data point is added to the second Gaussian process model at S3. Subsequently it is checked at S4, whether the total number n of adaptation data points is greater than a threshold value GW. If this is not the case—query result S4: no—the program sequence continues at S6.

Otherwise, the adaptation data point which influences the average value at least is removed at S5. Then the program branches back to point B and again queries the total number at S4. Via loop S4/S5 therefore, as many data adaptation points are removed from the second Gaussian process model until the total number n is below threshold value GW. Reduced memory complexity and faster cycle time are advantageous.

At S6, a check occurs as to whether the first Gaussian process model must be adjusted for presentation of the basic grid. If this is not necessary—query result S6: no—the program sequence is continued at point C. If an adjustment is required—query result S6: yes—then the first Gaussian process model is adjusted in such a way that the expectation value of the first Gaussian process model is readjusted via the second Gaussian process model. Thereafter, the program sequence flow is continued at point C. At S8 a check is made as to whether a time rank ZR has exceeded a threshold value. A time stamp is imprinted on each data point in the first Gaussian process model. A change in the data point, in other words a temporal drift, changes the time rank. If it is determined at S8 that time rank ZR is greater than threshold value GW—query result S8: yes, then a warning message, as well as the remaining useful cycle duration, is issued at S9 and the remaining program sequence is continued at S10. If, in contrast, it is determined at S8 that time rank ZR is less than threshold value GW—query result S8: no—then the program sequence is continued at point D and S10. A sensor failure, for example, of the NOx sensor can be detected via the query regarding the time rank. Equally, a non-permitted manipulation of the internal combustion engine can be recognized hereby. Based on the time ranking it is estimated how long a model-based continued operation of the internal combustion engine and the SCR catalytic converter is possible in spite of sensor defects. A check is made at S10, to see if the adapted values should be used in the main program. In the case of a positive test—query result S10: yes—a return into the main program in FIG. 4 occurs with a resultant transfer into the main program. In the case of a negative test; —query result S10: no—a return into the main program in FIG. 4 occurs, without the result being transferred into the main program.

FIG. 6 depicts the case where the current adaptation data point, for example, of the engine card, is not within the valid confidence range. The illustrated method is transferable to the SCR card in an analogous manner. The valid confidence range is defined by means of average value MW (expected value My) and the covariance (Sigma$^2$). Reference to FIG. 6 is meant to include FIGS. 6A to 6D. For better representation they are shown two-dimensionally. Plotted on the abscissa is value X which is representative for the input values of the model, that is the values fed back by the engine control unit: RG1, NOx setpoint value NOx(SL) and exhaust gas temperature setpoint value Tab(SL). A value Y which is representative of the adaptable model values, for example the fuel consumption of the internal combustion engine, is shown on the ordinate. In practice, values X and Y are multi-dimensional. A first adaptation data point A (2/1), a second adaptation data point B (3/1) and a current adaptation point C (2.5/0) are shown in FIG. 6A. Current adaptation data point C is not within the valid confidence range KB which is indicated by a crosshatched portion in the drawing. Thereafter, a check is made as to how valid confidence range KB (FIG. 6A) would change by removing the first adaptation data point A (2/1). It becomes apparent from FIG. 6B that in spite of removal of first adaptation data point A, the current adaptation data point C would still be outside the new confidence range KB1. Therefore, first adaptation point A will not be removed, but instead the second adaptation data point B (3/1). As illustrated in FIG. 6C, the current adaptation data value C is now within the new confidence range KB2. Thus, the second Gaussian process model is adapted in such a way that current adaptation data point C (2.5/0) is accepted and the already saved first adaptation data point A (2/1) remains. A new confidence range KB then results on the basis of the new calculation, as illustrated in FIG. 6D.

FIG. 7 illustrates the interaction of the overall system optimizer with the engine control unit and the SCR control unit for the selected parameters over time. Reference to FIG. 7 is meant to include FIGS. 7A to 7G. The following values are shown: FIG. 7A shows the progression of the setpoint torque M(SOLL), FIG. 7B shows the actual exhaust gas temperature Tab(IST) after the turbine, FIG. 7C shows the actual NOx value NOx(IST) after the turbine, FIG. 7D shows the exhaust gas mass flow dm after the turbine, FIG. 7E shows the specific fuel costs of the internal combustion engine (injection volume per kWh), FIG. 7F shows the SCR temperature TSCR, and FIG. 7G shows the reduction agent costs KSCR. The solid line indicates the progression of these values which are influenced by the overall system optimizer, whereas the difference thereto is indicated by the dashed line which shows the progression of these values without the overall system optimizer.

The additional explanation relates to the case that no overall system optimizer is used, in other words to the progression according to the dashed line. At time point 11 a load dump specified by the operator occurs from a first setpoint torque M1 to a second setpoint torque M2. As a result less fuel is being injected, so that the actual exhaust gas temperature value (Tab(IST) in FIG. 7B decreases from an initial value T1 to an end value T2 in accordance with a hyperbolic progression. The progression of the actual NOx value NOx(IST) in FIG. 7C corresponds to the decreased fuel injection in FIG. 7C, and the exhaust gas mass flow dm in FIG. 7D. Analogous thereto, the hyperbolic progression of the actual exhaust gas temperature value Tab(IST) causes an also decreasing progression of the SCR temperature TSCR in FIG. 7F. In turn, this results again in lower reduction agent consumption, that is, the SCR costs decrease from a first value KS1 to a second value KS2. Although less fuel is injected due to a load dump, the operating point of the internal combustion engine is relocated to a higher specific fuel consumption in the engine characteristics diagram. The specific fuel consumption is defined as injection volume (unit: cubic millimeter per stroke) for engine power (unit: kilowatt hours). Accordingly, the operating costs of the internal combustion engine increase in FIG. 7E from a first value K1 to a second value K2.

Figure 7A:
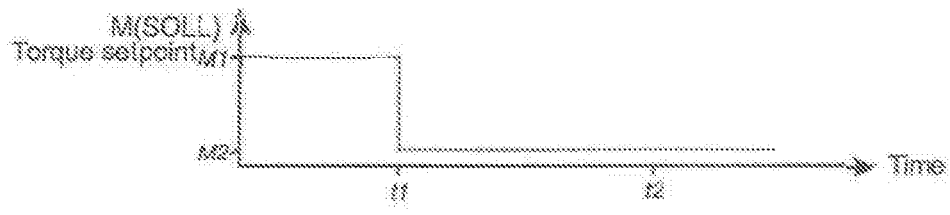
FIG. 7A is an operational timing diagram.
Figure 7B:
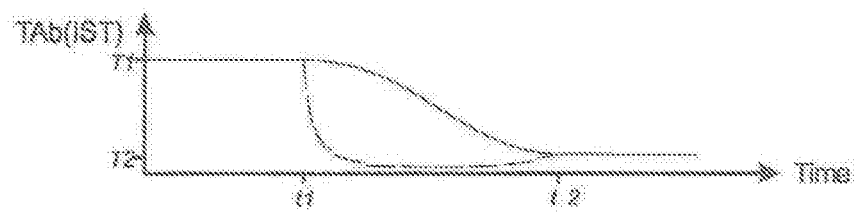
FIG. 7B is another operational timing diagram.
Figure 7C:
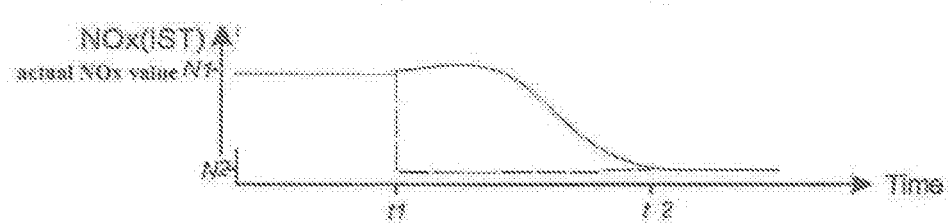
FIG. 7C is yet another operational timing diagram.
Figure 7D:
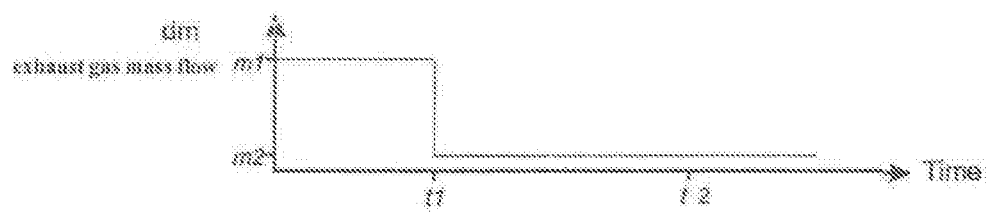
FIG. 7D is still yet another operational timing diagram.
Figure 7E:
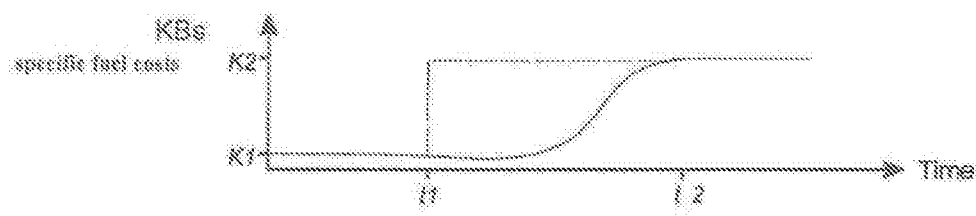
FIG. 7E is still yet another operational timing diagram.
Figure 7F:
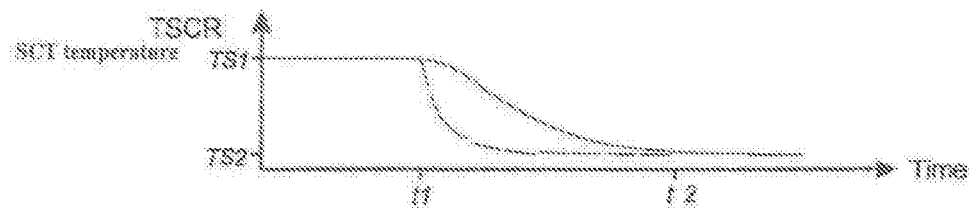
FIG. 7F is still yet another operational timing diagram.
Figure 7G:
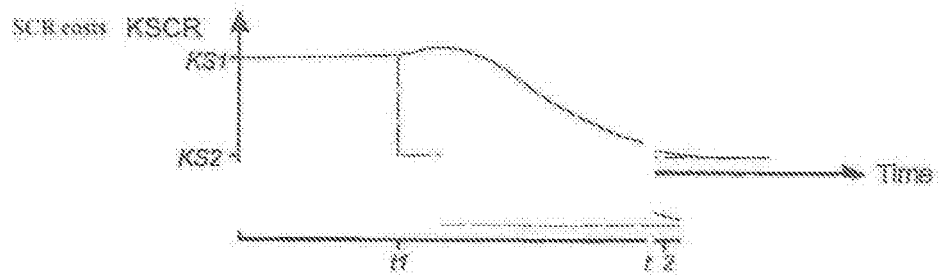
FIG. 7G is still yet another operational timing diagram.

A further explanation is given for the case that the overall system optimizer acts upon the system in the event of a load dump (FIG. 7A). The setpoint setting for the engine control unit causes the actual exhaust gas temperature value Tab (IST) in FIG. 7B to drop at a significantly reduced gradient within time space t1/t2. SCT temperature TSCR in FIG. 7F acts accordingly. Due to the higher SCT temperature, the SCR catalytic converter has a higher conversion rate, which in turn causes higher reduction agent consumption and thereby after time point t1 increasing costs. See FIG. 7G. The specific operating costs of internal combustion engine 1 in FIG. 7E however, remains on level K1 after time point t1 and subsequently increases with a clearly reduced gradient. The total costs, that is the sum of the specific fuel costs KBs (FIG. 7E) and the SCR costs KSCR, are however reduced compared to use without overall system optimizers.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

ABBREVIATIONS USED IN THE FIGURES

FIG. 1
M(SOLL) Torque setpoint
PWM signal for control of suction throttle 4
pCR rail pressure
pLL charging air pressure
TLL charging air temperature
Phi moisture in charging air
AGR exhaust gas actuator
TBP actuating signal for turbine bypass valve 18
DK actuating signal for controlling throttle valve 13
w1 adjustment angle of throttle valve 13
nIST actual engine speed
ve signal for control of injectors 7 (injection start/injection end)
pES pressure, individual accumulator
w2 adjustment angle of AGR actuator
Tab(IST) actual exhaust gas temperature
NOx(IST) actual NOx value
FIG. 2
RG1 feedback value
RG2 feedback value
EM(SL) emission setpoint
pCR(SL) setpoint rail pressure
SB injection start
SE injection end
LAM(SL) lambda setpoint value
AGR(SL) exhaust gas return setpoint value
TBP actuating signal for turbine bypass valve 18
AGR exhaust gas return
DK actuating signal for controlling throttle valve 13
PWM signal for control of suction throttle 4
pCR rail pressure
MESS1 collective reference for actual value
MESS2 actual value of SCR catalytic converter
DOS(SL) metering setpoint
DOS metering volume
FIG. 3
RG1 feedback value
RG2 feedback value
NOx1(P) predicted NOx value
dm(P) predicted exhaust gas mass flow
Tab(P) predicted exhaust gas temperature
TSCR(P) predicted SCR exhaust gas temperature
KSCR SCR costs
KBs specific fuel costs
Tab(SL) exhaust gas temperature setpoint
NOx(SL) NOx setpoint
Eta(P) predicted maximum conversion rate
EM(SL) emission setpoint
FIG. 4
M(SOLL) torque setpoint
nSL setpoint engine speed
BIBLIO library
UP GSO subprogram
J1 (ges) overall system quality measure
J2(ges) overall system quality measure
I≥iGW control variable i≥threshold variable

COMPONENT IDENTIFICATION

1 Internal combustion engine
2 Fuel tank
3 Low pressure pump
4 Suction throttle
5 High pressure pump
6 Rail
7 Injector
8 Individual accumulator
9 Rail pressure sensor
10 Engine control unit
11 Exhaust gas turbocharger
12 Charging air cooler
13 Throttle valve
14 Merging point
15 Inlet valve
16 Outlet valve
17 AGR actuator (AGR exhaust gas return)
18 Turbine bypass valve
19 Overall system optimizer
20 Optimizer
21 Adaptation
22 Combustion model
23 Gas path model
24 Rail pressure control circuit
25 Lambda control circuit
26 AGR control circuit
27 SCR control unit
28 SCR model
29 Adaptation
30 SCR control circuit
31 SCR catalytic converter
32 Default values
33 Engine card/map
34 SCR card
35 Operating cost function
36 Overall model
37 Summation point

What is claimed is:

1. A method for model-based control and regulation of an internal combustion engine with a Selective Catalytic Reduction (SCR) catalytic converter in which an operating point of the internal combustion engine is predefined by an engine control unit and an operating point of the SCR catalytic converter is predefined by an SCR control unit, the method comprising the steps of:
requesting an overall system quality measure that is calculated by an overall system optimizer in accordance with fed back values of the engine control unit and fed back values of the SCR control unit;
changing default values for the engine control unit; and
changing default values for the SCR control unit, the overall system optimizer minimizing the overall system quality measure for a prediction horizon with regard to operating costs, and wherein on the basis of the minimized overall system quality measure the overall system optimizer sets the default values for the engine control unit and the default values for the SCR control unit as decisive values for setting the operating points of the internal combustion engine and the SCR catalytic converter, wherein the overall system quality measure is minimized in that a first overall system quality measure is calculated by the overall system optimizer at a first point in time, at a second point in time a second overall system quality measure is predicted for the prediction horizon and a deviation between the first overall system quality measure and the second overall system quality measure is determined, and the overall system optimizer sets the second overall system quality measure as the minimized overall system quality measure in which the deviation is less than a threshold value.

2. The method of claim 1, wherein the operating costs are determined according to a Nelder-Mead method.

3. The method of claim 1, wherein the operating costs are determined by way of a model-predictive control.

4. A method for model-based control and regulation of an internal combustion engine with a Selective Catalytic Reduction (SCR) catalytic converter in which an operating point of the internal combustion engine is predefined by an engine control unit and an operating point of the SCR catalytic converter is predefined by an SCR control unit, the method comprising the steps of:
  requesting an overall system quality measure that is calculated by an overall system optimizer in accordance with fed back values of the engine control unit and fed back values of the SCR control unit;
  changing default values for the engine control unit; and
  changing default values for the SCR control unit, the overall system optimizer minimizing the overall system quality measure for a prediction horizon with regard to operating costs, and wherein on the basis of the minimized overall system quality measure the overall system optimizer sets the default values for the engine control unit and the default values for the SCR control unit as decisive values for setting the operating points of the internal combustion engine and the SCR catalytic converter, wherein the overall system quality measure is minimized in that a first overall system quality measure is calculated by the overall system optimizer at a first point in time, and at a second point in time a second overall system quality measure is predicted for the prediction horizon, and the overall system optimizer sets the second overall system quality measure as a minimized quality measure after running through a pre-definable number of new calculations.

5. The method of claim 4, wherein by way of the overall system optimizer an NOx setpoint value and an exhaust gas temperature setpoint value are predefined as the default values for the engine control unit and an emission setpoint value is predefined by the overall system optimizer as the default value for the SCR control unit.

6. The method of claim 5, wherein the overall system optimizer inputs fuel consumption, an actual NOx value, an actual exhaust gas temperature value and an exhaust gas mass flow as the fed back values of the engine control unit, and inputs a maximum conversion rate, an SCR time constant and a reducing agent consumption as the fed back values of the SCR control unit.

7. The method of claim 5, wherein the overall system optimizer calculates the default values for the engine control unit by means of an engine card and the default values for the SCR control unit by means of an SCR card using a Gaussian process model.

8. The method of claim 7, wherein the default values for the engine control unit and the SCR control unit are being adapted.

* * * * *